United States Patent
Kim et al.

(10) Patent No.: US 10,661,329 B2
(45) Date of Patent: May 26, 2020

(54) TWO DIFFERENT PROCESS CONTINUED PERFORMANCE TYPE PRODUCT ASSEMBLY DEVICE AND METHOD FOR MANUFACTURING BUMPER SKID PLATE USING THE SAME

(71) Applicant: Hyundai Motor Company, Seoul (KR)

(72) Inventors: Young-In Kim, Ulsan (KR); Young-Eun Hwang, Ulsan (KR); Min-Jin Choi, Bucheon-si (KR); Jae-Ho Shin, Daegu (KR)

(73) Assignee: Hyundai Motor Company, Seoul (KR)

( * ) Notice: Subject to any disclaimer, the term of this patent is extended or adjusted under 35 U.S.C. 154(b) by 517 days.

(21) Appl. No.: 15/377,682

(22) Filed: Dec. 13, 2016

(65) Prior Publication Data

US 2017/0312805 A1 Nov. 2, 2017

(30) Foreign Application Priority Data

Apr. 29, 2016 (KR) ..................... 10-2016-0053299

(51) Int. Cl.
*B29C 65/00* (2006.01)
*B29C 65/08* (2006.01)
*B26F 1/02* (2006.01)
*B21D 53/88* (2006.01)
*B29C 65/74* (2006.01)
(Continued)

(52) U.S. Cl.
CPC ............... *B21D 53/88* (2013.01); *B26F 1/02* (2013.01); *B29C 65/08* (2013.01); *B29C 65/7451* (2013.01); *B29C 65/7457* (2013.01); *B29C 66/1122* (2013.01); *B29C 66/21* (2013.01); *B29C 66/532* (2013.01); *B29C 66/61* (2013.01); *B29C 66/8223* (2013.01);
(Continued)

(58) Field of Classification Search
CPC ......... B21D 53/88; B21D 39/031; B26F 1/02; B29C 66/61; B29C 66/532; B29C 66/21; B29C 65/7457; B29C 65/7451; B60R 19/44; B29L 2031/3044; B26D 7/018
See application file for complete search history.

(56) References Cited

U.S. PATENT DOCUMENTS

| | | | |
|---|---|---|---|
| 7,469,455 B2 | 12/2008 | Distel | |
| 2004/0168559 A1* | 9/2004 | Ide | B26D 7/018 83/684 |
| 2006/0168792 A1* | 8/2006 | Reatherford | B21D 39/031 29/514 |

FOREIGN PATENT DOCUMENTS

| | | |
|---|---|---|
| CN | 203237189 U | 10/2013 |
| EP | 0 885 776 A1 | 12/1998 |

(Continued)

*Primary Examiner* — Lee A Holly
(74) *Attorney, Agent, or Firm* — Morgan, Lewis & Bockius LLP

(57) ABSTRACT

A two different process continued performance type product assembly device may include a punching jig having a punch and configured to ascend and descend, a punching tool located on a lower portion of the punching jig and having a punching die that is located below the punch during a punching work, a fusion tool located on the lower portion of the punching jig and having a fusion horn that is located below the punch during a fusion work, and a tool exchange cylinder configured to push the punching die so that the fusion horn secedes from a position below the punch during the punching work and to pull the punching die so that the fusion horn comes into the position below the punch during the fusion work.

11 Claims, 13 Drawing Sheets

(51) Int. Cl.
 *B60R 19/44* (2006.01)
 *B29L 31/30* (2006.01)
(52) U.S. Cl.
 CPC .......... *B29C 66/8322* (2013.01); *B60R 19/44*
 (2013.01); *B29L 2031/3044* (2013.01)

(56) References Cited

FOREIGN PATENT DOCUMENTS

| KR | 10-0644328 | B1 | 11/2006 |
| KR | 10-1564948 | B1 | 11/2015 |

\* cited by examiner

100

TWO DIFFERENT PROCESS CONTINUED PERFORMANCE TYPE PRODUCT ASSEMBLY DEVICE AND METHOD FOR MANUFACTURING BUMPER SKID PLATE USING THE SAME

CROSS-REFERENCE TO RELATED APPLICATIONS

The present application claims priority to Korean Patent Application No. 10-2016-0053299, filed on Apr. 29, 2016, the entire contents of which is incorporated herein for all purposes by this reference.

BACKGROUND OF THE INVENTION

Field of the Invention

Exemplary embodiments of the present invention relate to a bumper skid plate, and particularly, to a method for manufacturing a bumper skid plate using a product assembly device controlling an active air flap and an eco vehicle thereof, which can perform an open/close control of the active air flap based on an aerodynamic force gain portion at a low subzero ambient temperature.

Description of Related Art

In general, a process of manufacturing a bumper skid plate that is attached to the vehicle bumper is as follows.

First, a bumper skid plate injection material is manufactured through an injection molding process. Then, the bumper skid plate injection material is moved onto a punching device, and a towing hook hole is processed on the bumper skid plate injection material through a punching process. Thereafter, the bumper skid plate injection material on which the towing hook hole is processed is moved onto a fusion device, and a bracket for assembling a towing hook cap is attached to a towing hook hole portion through a fusing process. Finally, the bumper skid plate is completed from the bumper skid plate injection material by performing a post-process. The post-process includes a cap attaching process for coupling the towing hook cap to the towing hook hole and a coating process for coating color on the whole plate.

The bumper skid plate manufactured as above is attached to a lower end portion of a bumper that is applied to the front and rear of the vehicle, and thus the bumper and the lower portion of the vehicle can be protected against road impact, and a tough external appearance design is reinforced to secure external appearance merchantability.

However, the process of manufacturing a bumper skid plate has the following limitations.

One is on the side of manufacturing facilities, and is caused by duality of the punching device and the fusing device. As an example, on the side of space utility, the punching device and the fusing device require separate installation spaces, and on the side of workers, two workers for separately operate the punching device and the fusing device are required. Further, on the side of product movement, scratch inferiority may occur while a product is moved to be processed through the injection molding process, the punching process, and the fusing process.

Another is on the side of a manufacturing process, and is caused by the injection molding process. As an example, if the towing hook hole is formed together in the injection molding process other than in the punching process, the problems occurring on the side of manufacturing facilities can be solved, but in the case of directly forming the towing hook hole on the bumper skid plate injection material through the current injection molding technology, weld lines may occur on the end portion side of the towing hook hole, and thus external appearance quality problems may occur to cause mass production of the bumper skid plates to become impossible.

Still another is on the side of the quality of the product, and is caused by the application of the coating process. As an example, the application of the coating process causes the manufacturing cost to be increased, and field claims may occur due to peel-off of the coatings.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a two different process continued performance type product assembly device and a method for manufacturing a bumper skid plate using the same, which can solve the drawbacks of requiring additional work space, manpower, and product movement due to application of two independent devices and secure injection molding quality by adopting one device in which a punching device and a fusing device are constructed together, and which can reduce the manufacturing cost and solve the problem of field claims due to peel-off of coatings by performing injection molding with a material of a metallic tone (or metallic-tone material).

Various aspects of the present invention are directed to providing, a two different process continued performance type product assembly device includes a punching jig having a punch and configured to ascend and descend; a punching tool located on a lower portion of the punching jig and having a punching die that is located below the punch during a punching work; a fusion tool located on the lower portion of the punching jig and having a fusion horn that is located below the punch during a fusion work; and a tool exchange cylinder configured to push the punching die so that the fusion horn secedes from a position below the punch during the punching work and to pull the punching die so that the fusion horn comes into the position below the punch during the fusion work.

The punching jig, the punching tool, and the fusion tool may be coupled to a guide frame, and the guide frame may include a jig bracket on which the punching jig is mounted, a cylinder bracket on which the punching tool and the fusion tool are mounted, a mount plate having an upper portion that is formed by the punching jig bracket and a lower portion that is formed by the cylinder bracket, and an LM guide configured to couple the punching jig bracket and the mount plate to each other. The LM guide may include an LM rail provided on the mount plate and an LM block provided on the punching jig bracket.

The punching jig may further include a motor and a ball screw that are tied together by a timing belt, and the ball screw may be fixed to the punching jig bracket on which the punch is mounted to make the punching jig bracket ascend and descend in a rotating direction of the motor. The punching jig may further include a stripper coupled to the punch, and an original point sensor coupled to the punching jig bracket to detect ascending and descending positions of the punching jig bracket.

The punching tool may further include a link bracket configured to connect the punching die and the tool exchange cylinder to each other, and the link bracket may be hinge-engaged with the cylinder bracket.

The fusion tool may further include a fusion cylinder configured to make the fusion horn ascend and descend, and the fusion cylinder may be coupled to the cylinder bracket.

A product setting jig may be located on an upper side of the punching tool and the fusion tool, and a product may be put on the product setting jig for the punching work and the fusion work. The product setting jig may be constructed together with a product fixing jig, and the product fixing jig may fix the product. The punching work and the fusion work may be automatically controlled by a control device.

In accordance with another exemplary embodiment of the present invention, a method for manufacturing a bumper skid plate includes setting a bumper skid plate injection material that is put on a product setting jig through a product fixing jig; moving a punching jig and a punching tool onto the bumper skid plate injection material under the control of a control device, and performing a punching work for forming a towing hook hole on the bumper skid plate injection material using a punch and a punching die and then returning to an initial state for the punching work; and moving a punching jig and a fusion tool onto the bumper skid plate injection material under the control of the control device in a state where the bumper skid plate injection material is put on the product setting jig, and performing a fusion work for fusing a bracket for assembling a towing hook cap into the towing hook hole using the punch and a fusion horn and then returning to an initial state for the fusion work; and taking the bumper skid plate injection material out of the product setting jig after fusing the bracket for assembling the towing hook cap, and assembling the towing hook cap into the towing hook hole to complete the manufacturing of the bumper skid plate.

The punching work may be performed by moving the punching die below the punch through an operation of a tool exchange cylinder, stopping the tool exchange cylinder in a state where working lines of the punch and the punching die coincide with each other, operating a motor so that a punching jig descends toward the bumper skid plate injection material by a ball screw that is tied to the motor through a timing belt, making the punching die return to its initial state so that the tool exchange cylinder re-operates to secede from the position below the punch when the towing hook hole is formed, and making the motor re-operate to return to its initial state where the punching jig ascends.

The fusion work is performed by moving the punching die so that the punching die secedes from the position below the punch through an operation of a tool exchange cylinder, stopping the tool exchange cylinder in a state where working lines of the punch and the fusion horn coincide with each other, stopping a fusion cylinder after operating the fusion cylinder so that the fusion horn ascends, operating a motor so that the punching jig descends toward the bumper skid plate injection material by a ball screw that is tied to the motor through a timing belt, stopping the fusion horn after operating the fusion horn so that the fusion horn fuses the bracket for assembling the towing hook cap into the towing hook hole, and making the motor re-operate to retune to its initial state where the punching jig ascends when the bracket for assembling the towing hook cap is fused.

The bumper skid plate according to an exemplary embodiment of the present invention is manufactured as a bumper component through a post-process in which the towing hook cap is assembled into the towing hook hole after the fusing process for fusing the bracket for assembling the towing hook cap into the towing hook hole that is formed on the bumper skid plate injection material of a metallic tone through the punching process.

As described above, the product assembly device according to an exemplary embodiment of the present invention manufactures the bumper skid plate by tying the punching device and the fusion device that successively operate into one, and has the following advantages and effects.

First, the space use is configured to be reduced through unification of the punching device and the fusion device, and the product assembly device can be operated by one working person.

Second, since the punching and fusion work can be performed without product movement, the scratch inferiority that is caused by the movement of the product can be prevented from occurring.

Third, during the injection molding, the product having no weld line can be secured.

Fourth, since the coating process can be deleted through application of the material of the metallic tone (or metallic-tone material), the manufacturing cost is reduced, and the problem of the field claims due to the peel-off of the coating can be solved.

Fifth, the facility investment cost is reduced, and the productivity is improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
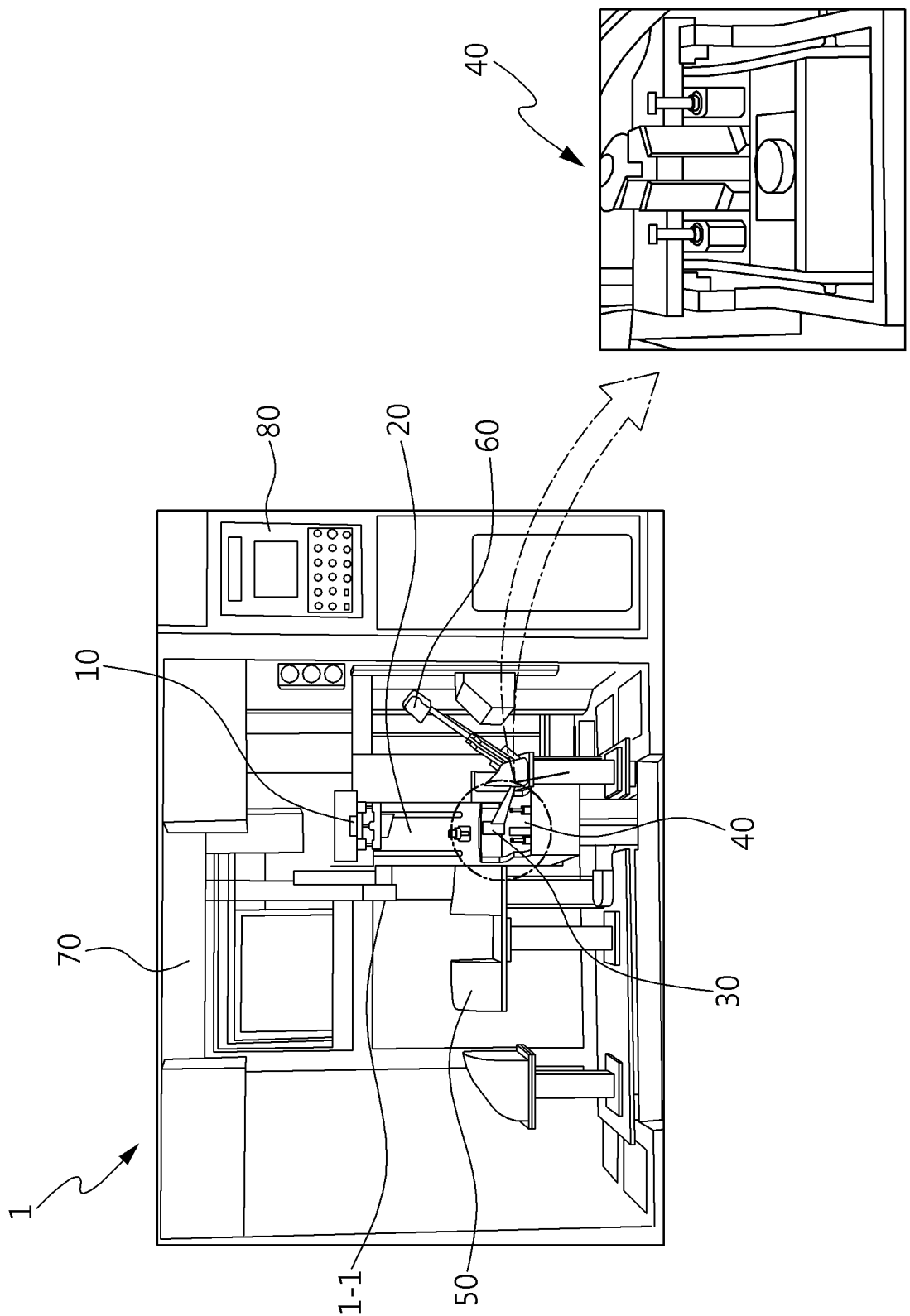
FIG. 1 is a view illustrating the configuration of a 2-process product assembly device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a 2-process product assembly device 1 includes a 2-process device 1-1 configured to perform ultrasonic punching and ultrasonic fusion work, a product setting jig 50, a product fixing jig 60, a frame case 70, and a control device 80 configured to automatically control ultrasonic punching and ultrasonic fusing processes. A plurality of 2-process devices 1-1 may be provided to simultaneously perform a plurality of towing hook hole punching works and a plurality of towing hook cap assembly bracket fusion works at a time.

The 2-process device 1-1 includes a punching jig 10, a guide frame 20, a punching tool 30, and a fusion tool 40. As an example, the punching jig 10 forms an upper portion of the 2-process device 1-1. The punching jig 10 descends toward the punching tool 30 to perform a punching work, or descends toward the fusion tool 40 to perform a fusion work using a motor power. Then, the punching jig 10 ascends to return to its initial position. The guide frame 20 forms a connection portion of the 2-process device 1-1 to unify the punching jig 10, the punching tool 30, and the fusion tool 40, and guides ascending/descending movement of the punching jig 10. The punching tool 30 and the fusion tool 40 form a lower portion of the 2-process device 1-1, and are associated with the punching jig 10 to perform an ultrasonic punching work. The fusion tool 40 is associated with the punching jig 10 to perform ultrasonic fusion work.

The product setting jig 50 provides a place on which a product is put, and has a height at which the product is put as a position where the punching jig 10, the punching tool 30, and the fusion tool 40 meet one another. The form of the product setting jig 50 may be diversely modified in accordance with the shape of the product to match the structure of a bumper skid plate injection material (See FIG. 6).

The product fixing jig 60 fixes the product that is put on the product setting jig 50 through application of a joint structure that is folded toward the product.

The frame case is provided with a frame together with an inner space to accommodate the 2-process device 1-1, the product setting jig 50, and the product fixing jig 60 and to support fixation and movement thereof.

The control device 80 performs ultrasonic punching and ultrasonic fusion work, and has an embedded program for automatically controlling a movement of the punching jig 10 and the punching tool 30 during a punching work and movement of the punching jig 10 and the fusion tool 40 during a fusion work. The program controls the ultrasonic punching and ultrasonic fusion work through a data input. Accordingly, the control device 80 is an electrical circuit for a control signal output and a detection signal input, and controls a movement of the punching jig 10, the punching tool 30, and the fusion tool 40.

Figure 2:
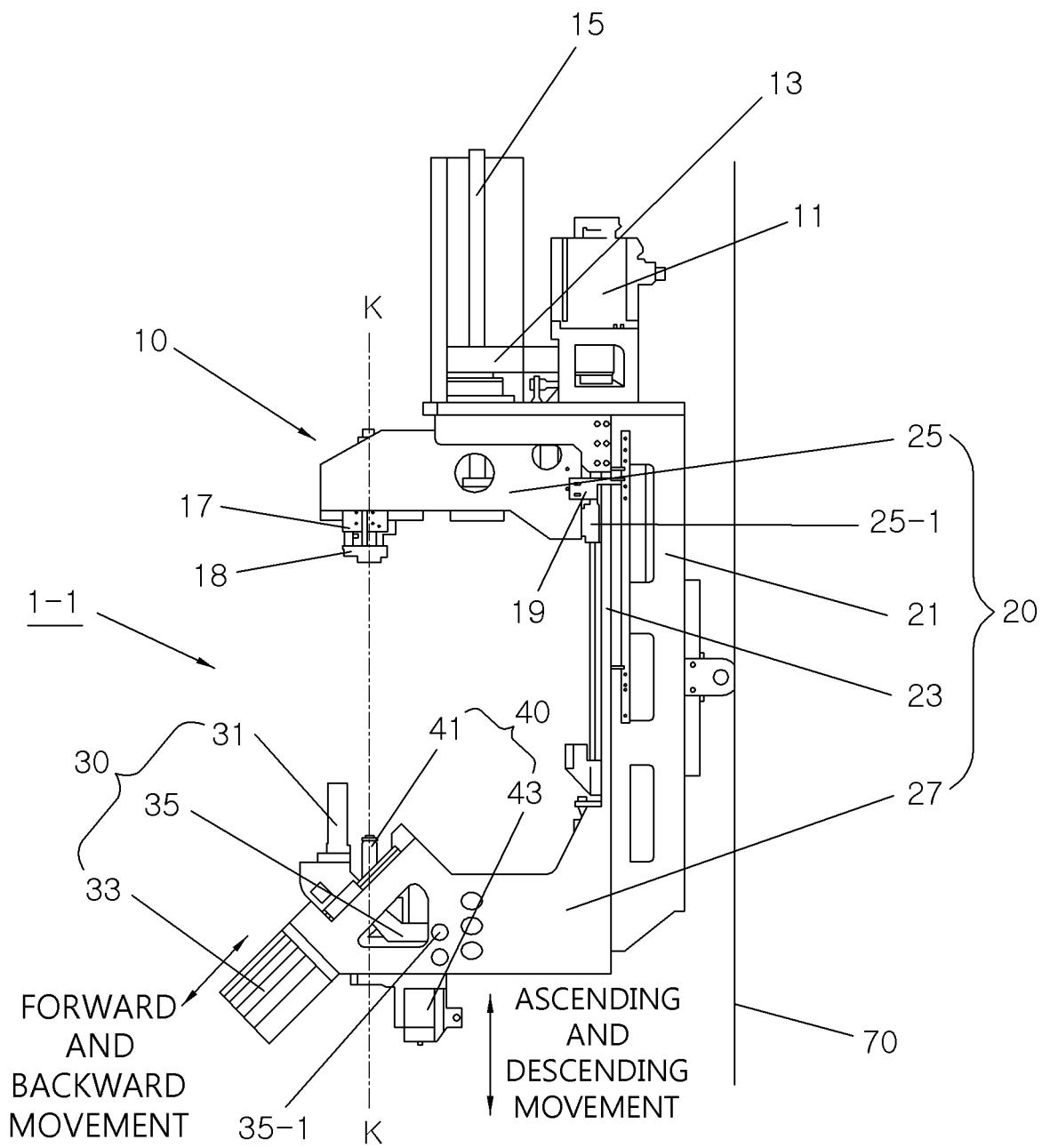
FIG. 2 is a view illustrating the configuration of a 2-process device that forms a 2-process product assembly device according to an exemplary embodiment of the present invention.
Figure 3:
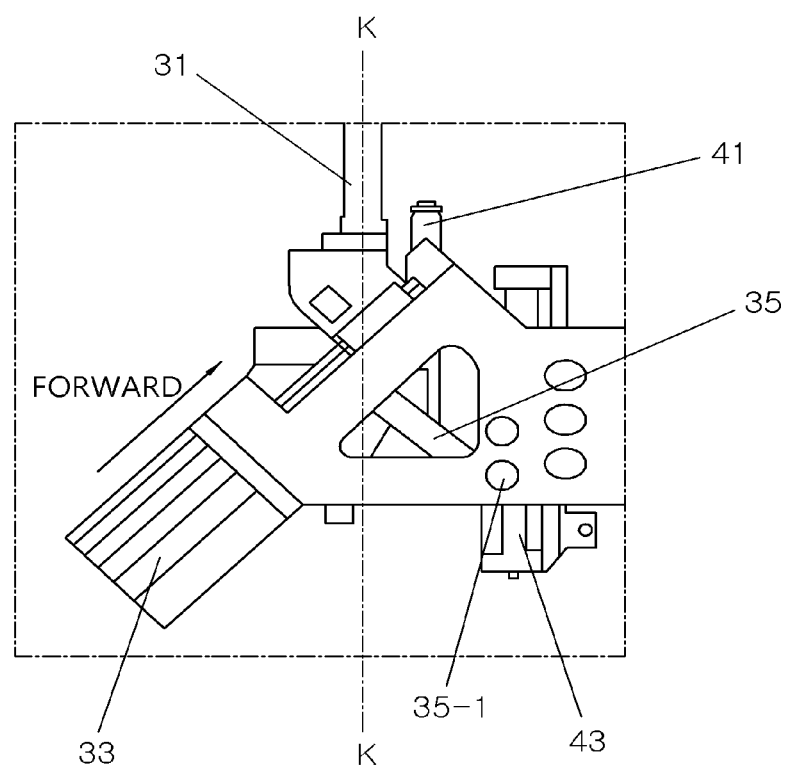
FIG. 3 is a view illustrating an operation state of a punching tool that forms a 2-process device according to an exemplary embodiment of the present invention.
Figure 4:
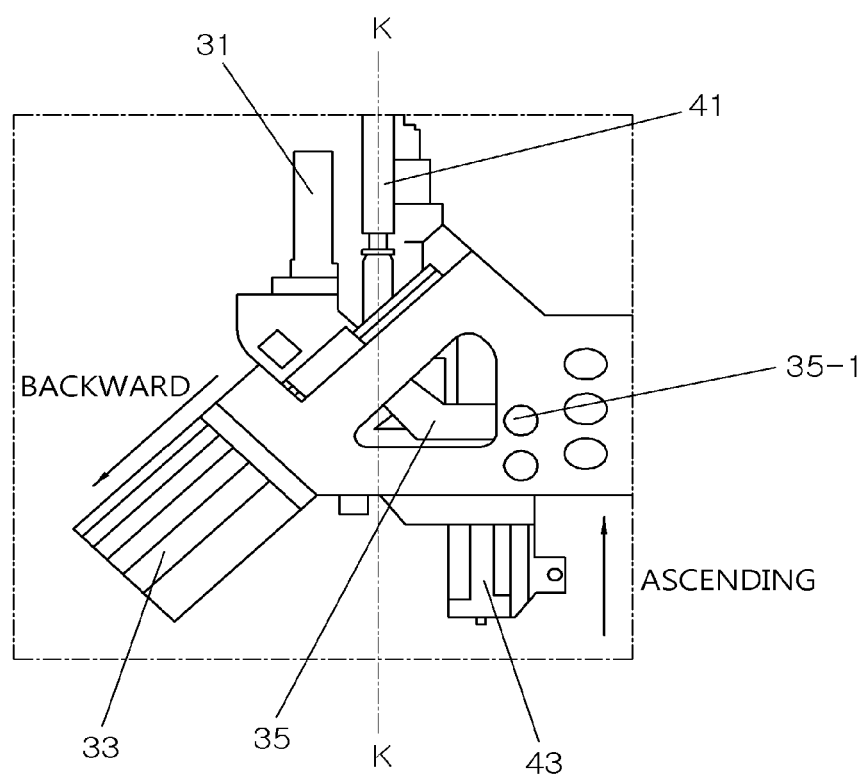
FIG. 4 is a view illustrating an operation state of a fusion tool that forms a 2-process device according to an exemplary embodiment of the present invention.

On the other hand, FIG. 2, FIG. 3 and FIG. 4 illustrate the detailed configuration of the 2-process device 1-1.

Referring to FIG. 2, the punching jig 10 includes a servo motor type motor 11, a timing belt 13, a ball screw 15, a punch 17, a stripper 18, and an original point sensor 19. In this case, the motor 11, the timing belt 13, and the ball screw 15 are constructed as ascending/descending members for making the punch 17 ascend and descend. The guide frame 20 includes a mount plate 21 that is mounted in a frame case 70, an LM guide that includes an LM rail 23 and an LM block 25-1, a punching jig bracket 25 positioned on an upper portion of the mount plate 21, and a cylinder bracket 27 positioned on a lower portion of the mount plate 21. The punching tool 30 includes a punching die 31, a tool exchange cylinder 33, a link bracket 35, and a hinge pin 35-1. The fusion tool 40 includes a fusion horn 41 and a fusion cylinder 43.

Accordingly, the punching jig 10 is assembled as follows. The motor 11 is coupled to the mount plate 21. The ball screw 15 penetrates a ball screw case that is coupled to the mount plate 21 to be fixed to the punching jig bracket 25, and makes the punching jig bracket 25 ascend and descend in accordance with the rotating direction of the motor 11. For this, the LM block 25-1 is provided on the punching jig bracket 25, and a plurality of LM rails are vertically provided on the mount plate 21. The timing belt 13 ties the motor 11 and the ball screw 15 to each other. The punch 17 is provided on the punching jig bracket 25 to face the punching tool 30 and the fusion tool 40. The stripper 18 is constructed together with the punch 17 to perform fixation and position determination of a processed material during the punching and fusion work, to remove scrap from the punch 17, and to guide and protect the punch 17. The original point sensor 19 is provided on the mount plate 21, and holds a return position of the punch 17 according to the ascending and descending of the punching jig bracket 25.

The punching tool 30 and the fusion tool are assembled as follows. The punching die 31 is coupled to an inside of the cylinder bracket 27. The tool exchange cylinder 33 is slantingly coupled to the cylinder bracket 27, and is exposed to an outside of the cylinder bracket 27. The link bracket 35 is coupled to the cylinder bracket 27 via the hinge pin 35-1 to move the punching die 31 forward and backward against the tool exchange cylinder 33. The link bracket 35 has a bending structure to move the hinge pin 35-1 around a rotation center. However, when an arc shaped slot or a straight line channel is formed in which the cylinder bracket 27 that is fitted into the hinge pin 35-1 moves, the link bracket 35 may not adopt the bending structure. The fusion horn 41 is coupled to an inside of the cylinder bracket 27 at an interval with the punching die 31, and is connected to the punching die 31 to move forward and backward together with the punching die 31. The fusion horn is of an ultrasonic horn type that performs fusion through generation of friction on a contact surface by horizontal vibration and vertical pressing force. The fusion cylinder 43 is vertically coupled to the cylinder bracket 27 to make the fusion horn 41 to ascend and descend, and is exposed outside of the cylinder bracket 27.

Accordingly, the punch 17 forms a work line K-K on the punching die 31 and the fusion horn 41, and the work line K-K is changed in accordance with the forward and backward movement of the tool exchange cylinder 33.

FIG. 3 illustrates forward movement of the tool exchange cylinder 33. Referring to FIG. 3, the punching die 31 moves forward to push the fusion horn 41 from the work line K-K, and as a result, the work line K-K matches the punch 17 and the punching die 31.

In contrast, FIG. 4 illustrates backward movement (initial position) of the tool exchange cylinder 33. Referring to FIG. 4, the punching die 31 moves backward (initial position) to be pushed from the work line K-K, and as a result, the work line K-K matches the punch 17 and the fusion horn 41.

Figure 5:
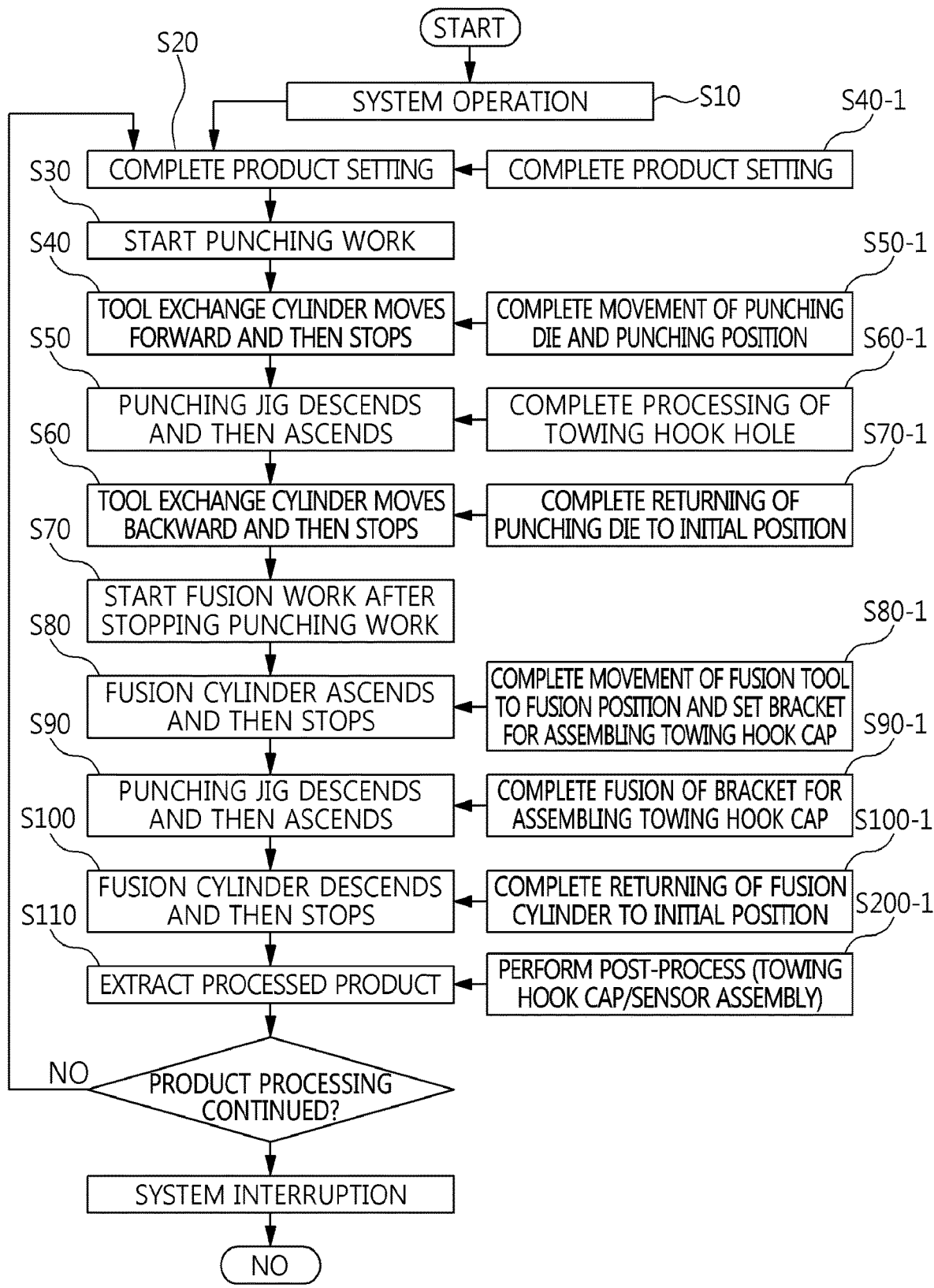
FIG. 5 is a flowchart illustrating a method for manufacturing a bumper skid plate using two different process type product assembly device according to an exemplary embodiment of the present invention.

On the other hand, FIG. 5 is a flowchart illustrating a method for manufacturing a bumper skid plate using two different process type product assembly device according to an exemplary embodiment of the present invention.

As illustrated, a method for manufacturing a bumper skid plate manufactures in one place and space without moving a bumper skid plate injection material by successively executing a punching process and a fusing process. Hereinafter, the method for manufacturing the bumper skid plate will be described in detail with reference to FIGS. 6 to 10. In the instant case, the control subject is a control device 80 that performs the punching process and the fusing process in accordance with a predetermined program procedure. Further, it is assumed that the punching process and the fusing process are performed through application of ultrasonic waves.

Operation S10 refers to system operation. The system operation means power supply to a punching jig 10, a punching tool 30, a fusion tool 40, and a control device 80 and a program operation. This operation is automatically performed by the control device 80.

Figure 6:
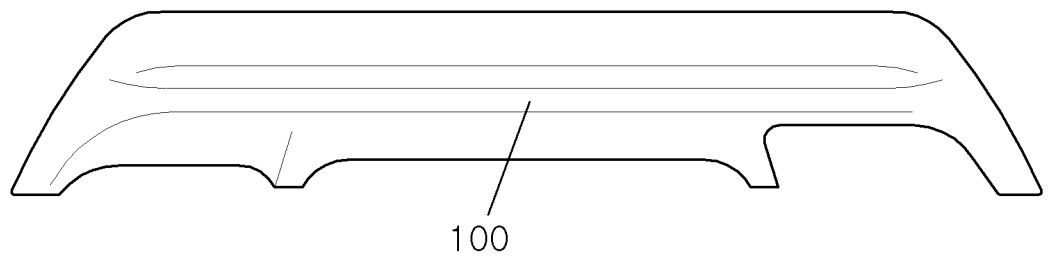
FIG. 6 is a view illustrating an example of a bumper skid plate injection material that is processed by a 2-process product assembly device according to an exemplary embodiment of the present invention.

Operation S20 refers to product setting completion. The product setting is performed such that a product is put using a product setting jig 50 and then is fixed by a product fixing jig 60 (when, the product fixing may be performed after vacuum absorption using a vacuum device). As a result, a bumper skid plate on which a towing hook hole is not formed is set as a product. Referring to FIG. 6, a bumper skid plate on which a towing hook hole is not formed is exemplified as a bumper skid plate injection material 100. The bumper skid plate injection material 100 is injection-molded with a material of a metallic tone (or metallic-tone material), and thus a coating process for providing a feeling of a tough external appearance is deleted.

Operation S30 refers to punching process performance, and is divided into operations S40 to S60. Operation S40 refers to a forward operation and stopping of a tool change cylinder. As a result, movement of the punching die and the punching position is completed as at operation S40-1. Operation S50 refers to ascending of the punching jig after its descending. As a result, towing hook hole processing is completed as at operation S50-1. Operation S60 refers to backward operation and stopping of the tool change cylinder. As a result, the punching die's return to an initial position is completed as at operation S60-1.

Figure 7:
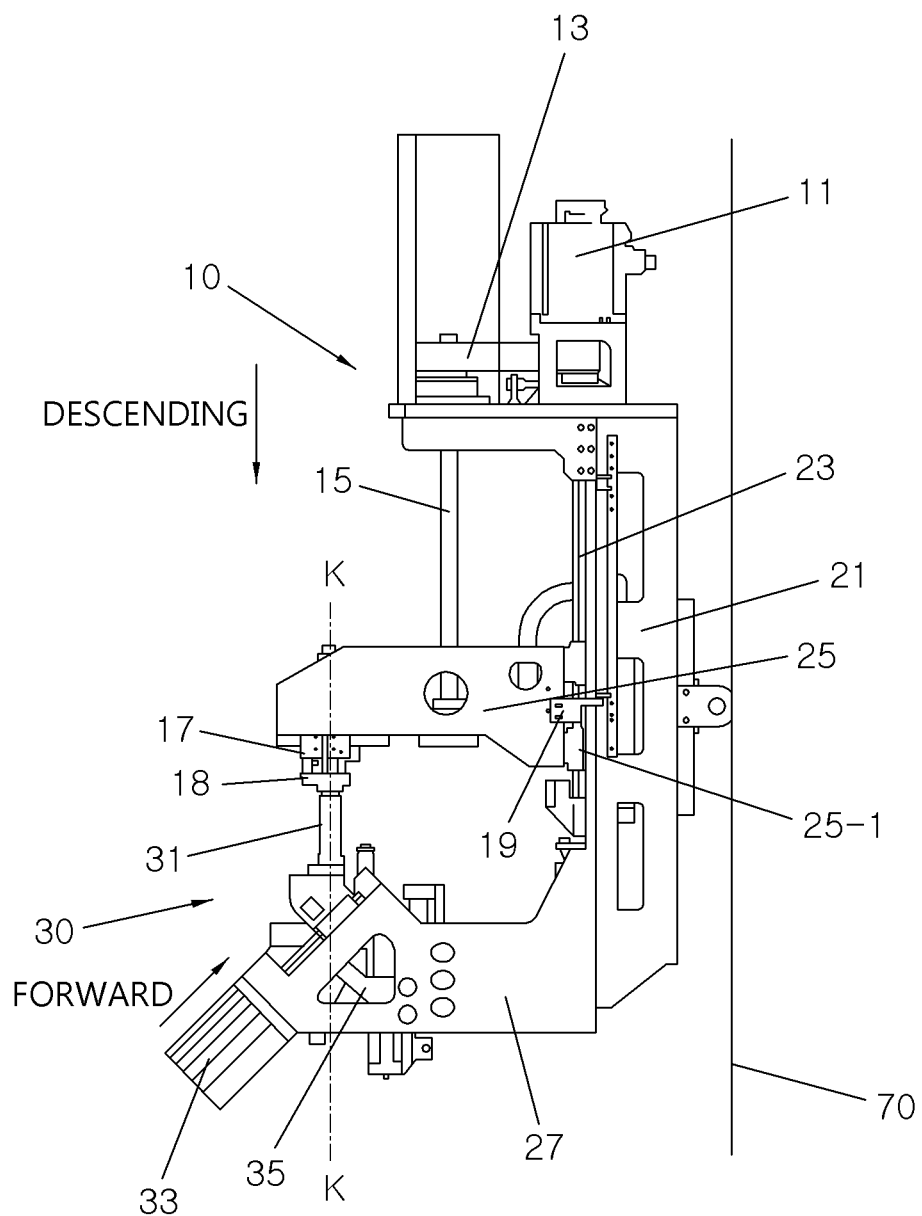
FIG. 7 and FIG. 8 are views illustrating a punching work state for processing a towing hook hole according to an exemplary embodiment of the present invention.

Referring to FIG. 7, the control device 80 gives a control signal to the tool exchange cylinder 33 to match the work line K-K to the punch 17 and the punching die 31. In the instant case, since the control signal is a signal for forward movement, which draws a rod of the tool exchange cylinder 33, the rod of the tool exchange cylinder 33 is drawn out through a hydraulic (or pneumatic) action. Then, a link bracket 35 pushes the punching die 31 around the movement center of the hinge pin 35-1 by the rod, and thus the fusion horn 41 is pushed together with the punching die 31. As a result, the work line K-K of the punch 17 coincides with the punching die 31 instead of the fusion horn 41.

Then, the control device 80 stops the control of the tool exchange cylinder 33 and controls the motor 11. In the instant case, it is assumed that forward rotation of the motor 11 corresponds to descending of a ball screw 15. The forward rotation of the motor 11 causes the ball screw 15 to be rotated through the timing belt 13, and the ball screw 15 pushes the punching jig bracket 25 downward. In the instant case, a movement of the punching jig bracket 25 is guided to an LM rail 23 and an LM block 25-1. As a result, the punch 17 descends toward the punching die 31 together with the punching jig bracket 25.

Figure 8:
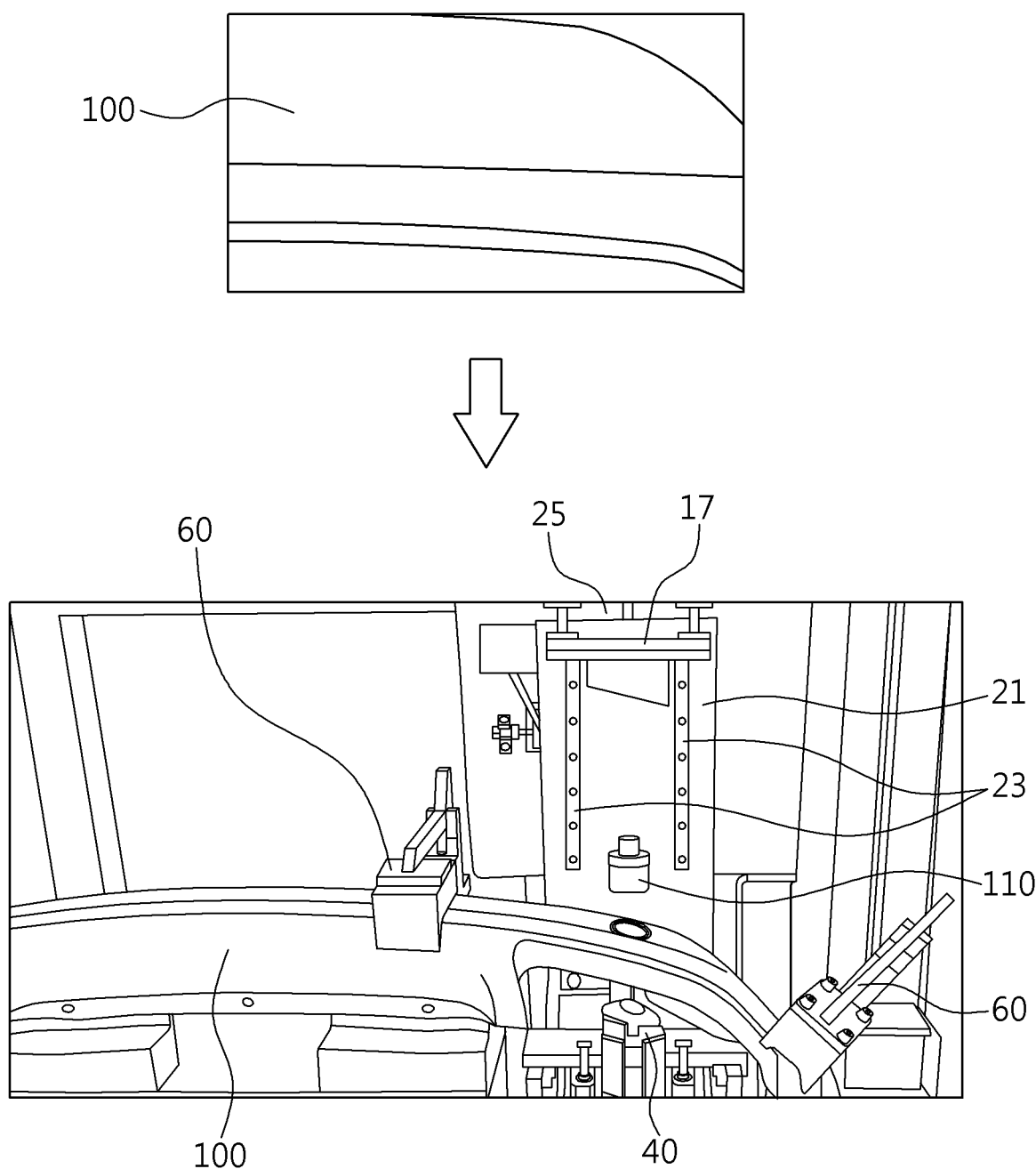

Referring to FIG. 8, the control device 80 continues the control of the motor 11 in a state where the punch 17 and the punching die 31 are positioned on upper and lower portions of the bumper skid plate injection material 100, and as a result, a towing hook hole 110 is formed on the bumper skid plate injection material 100 by the action of the punch 17 and the punching die 31.

Thereafter, the control device 80 controls the motor 11 to rotate reversely to make the punching jig bracket 25 ascend, and thus the punch 17 is separated from the bumper skid plate injection material 100 to cause the punching jig 10 to return to its initial state. At the same time, by releasing hydraulic pressure (or air pressure) so that the tool exchange cylinder 33 moves backward (initial position), the punching die 31 is separated from the bumper skid plate injection material 100, and as a result, the punching tool 30 returns to its initial state. That is, the work line K-K matches the punch 17 and the fusion horn 41.

On the other hand, operation S70 refers to performance of the fusing process after completion of the punching process, and is divided into operations S70 to S100. Step S80 refers to ascending and stopping of the fusion cylinder, and as a result, movement of the fusion tool position and setting of the bracket for assembling the towing hook cap are completed as at operation S80-1. Step S90 refers to ascending of the punching jig after the descending thereof, and as a result, fusion of the bracket for assembling the towing hook cap is completed as at operation S90-1. Step S100 refers to descending and stopping of the fusion cylinder, and as a result, returning of the fusion cylinder to its initial position is completed as at operation S100-1.

Figure 9:
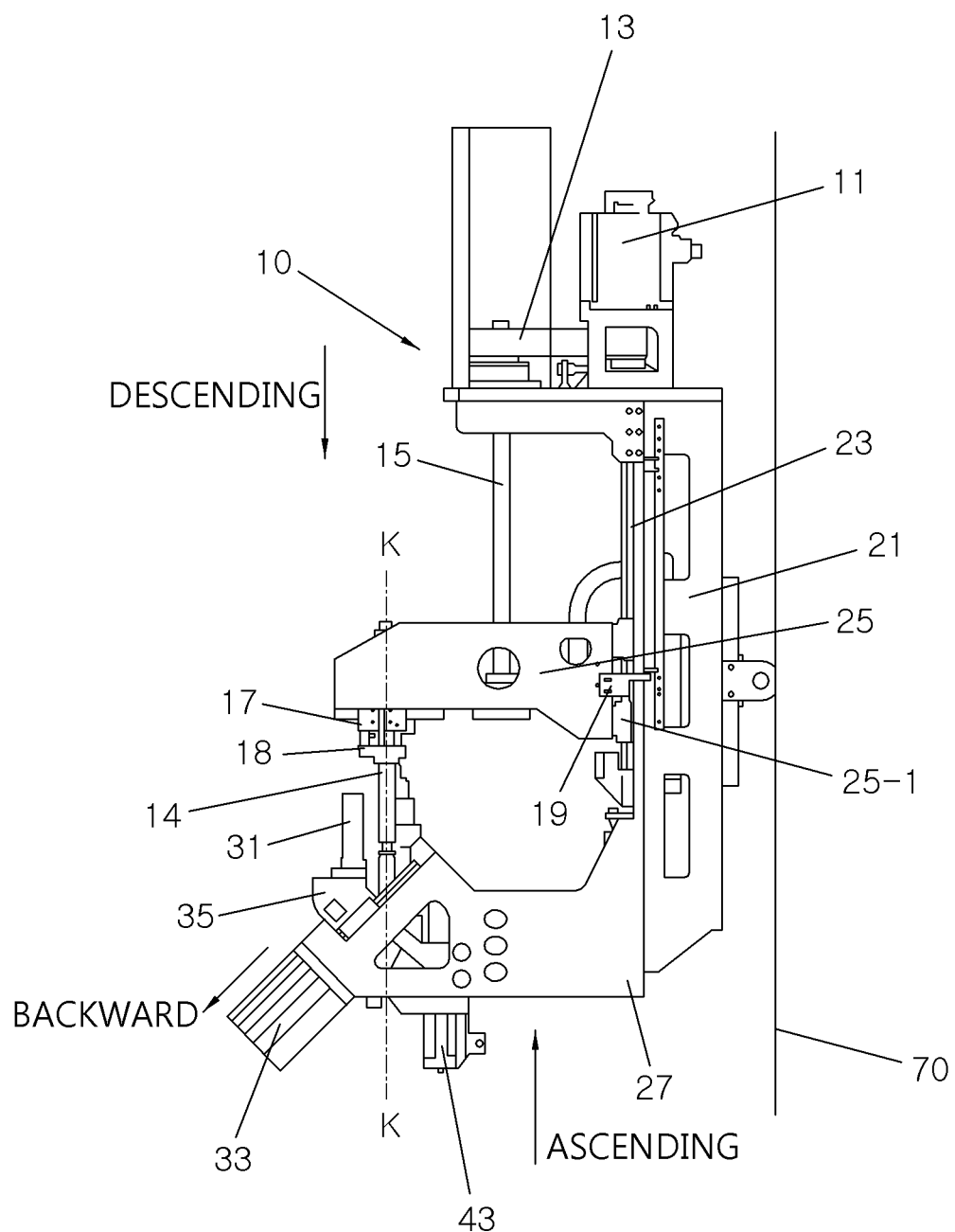
FIG. 9 and FIG. 10 are views illustrating a fusion work state for fusing a bracket for processing a towing hook hole according to an exemplary embodiment of the present invention.

Referring to FIG. 9, the control device 80 gives a control signal to the fusion cylinder 43 to make the rod of the fusion cylinder 43 drawn out through a hydraulic (or pneumatic) action, and as a result, the fusion horn 41 ascends upward to make the bracket 120 for assembling the towing hook cap positioned toward the towing hook hole 110 of the bumper skid plate injection material 100. Then, the control device 80 stops the control process of the fusion cylinder 43 to control the motor 11. Since the control of the motor 11 and the result thereof is the same as the process of FIG. 7 that causes the punch to descend, the detailed explanation thereof will be omitted.

Figure 10:
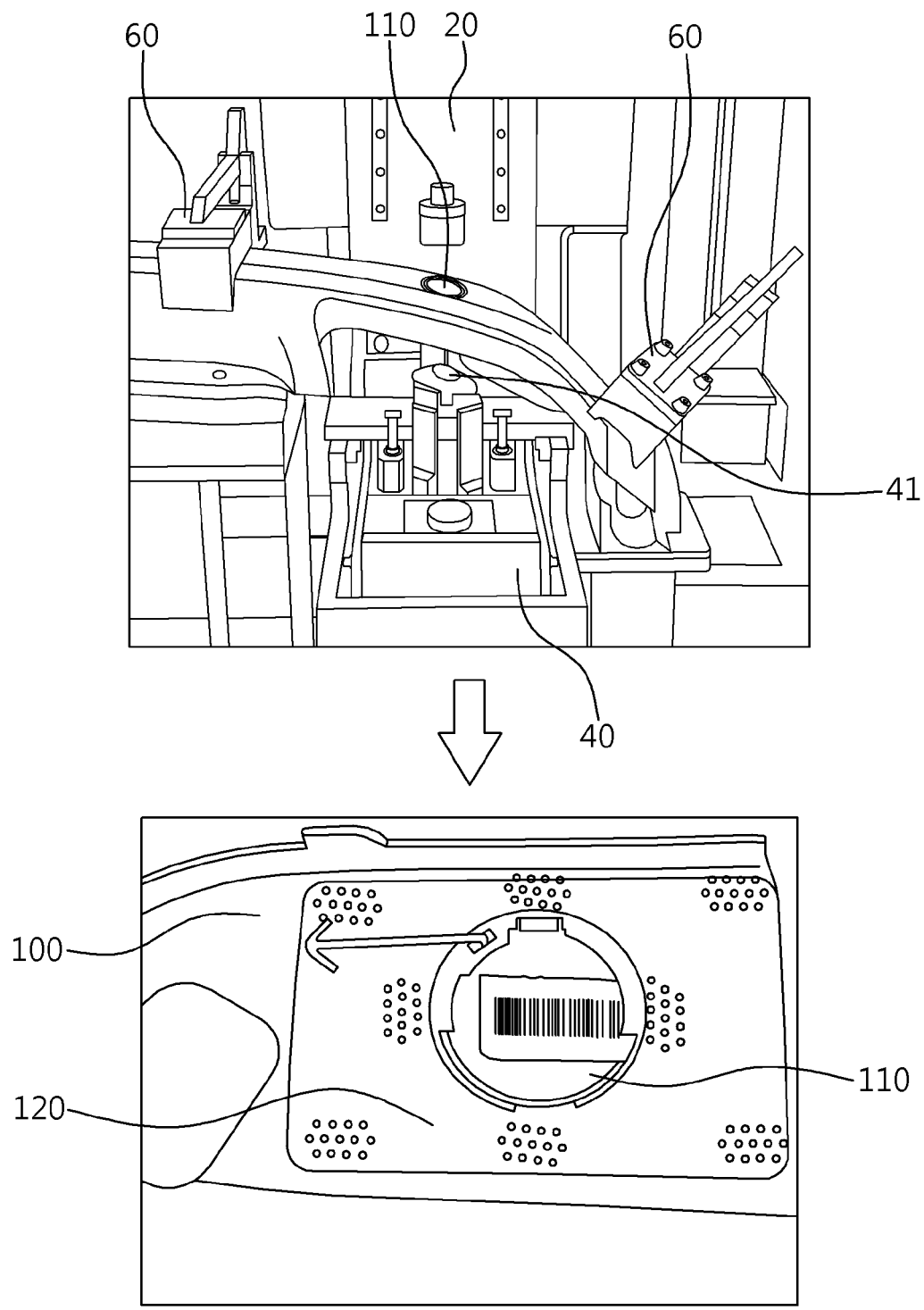

Referring to FIG. 10, the control device 80 applies ultrasonic vibration to the fusion horn 41 in a state where the punch 17 and the fusion horn 41 are positioned on the upper and lower portions of the towing hook hole 110 of the bumper skid plate injection material, and as a result, the bracket 120 for assembling the towing hook cap is fused onto the periphery of the towing hook hole 110.

Thereafter, since the control device 80 makes the motor 11 rotate backward to cause the punching jig bracket 25 to move upward, the punch 17 is separated from the bumper skid plate injection material 100, and as a result, the punching jig 10 returns to its initial state. At the same time, by releasing the hydraulic pressure (or air pressure) so that the fusion cylinder 43 moves backward (initial position), the fusion horn 41 is separated from the bumper skid plate injection material 100, and as a result, the fusion horn 41 returns to its initial state. That is, the work line K-K maintains the state where it matches the punch 17 and the fusion horn 41.

On the other hand, operation S200 refers to extraction of the processed product, and as a result, a post-process as at step S200-1 is performed. Then, when the product processing continues as at operation S300, the process returns to the step S20 to repeat the product processing, or to interrupt the system as at operation S400 when the product processing is stopped as at operation S300 to interrupt the product processing.

Here, the post-process is a cap attachment process for coupling the towing hook cap 130 to the towing hook hole (when, a sensor attachment process for coupling a sensor using the bracket 120 for assembling the towing hook cap may be added). The post-process does not require the coating process for coating color on the whole plate, and this is because the bumper skid plate injection material 100 is injection molded with a material of a metallic tone (or metallic-tone material). Accordingly, the method for manufacturing the bumper skid plate has the advantages that the manufacturing cost is reduced through the deletion of the coating process, and the field claim occurrence due to the coating peel-off can be thoroughly prevented.

Figure 11:
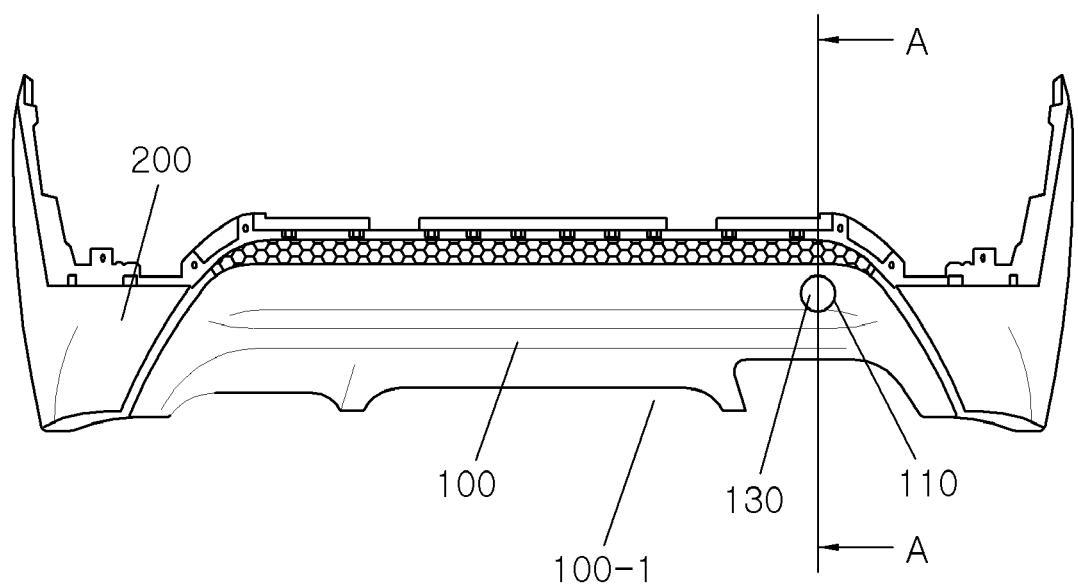
FIG. 11 is a view illustrating an example of a bumper skid plate that is completed by a 2-process product assembly device according to an exemplary embodiment of the present invention.
Figure 12:
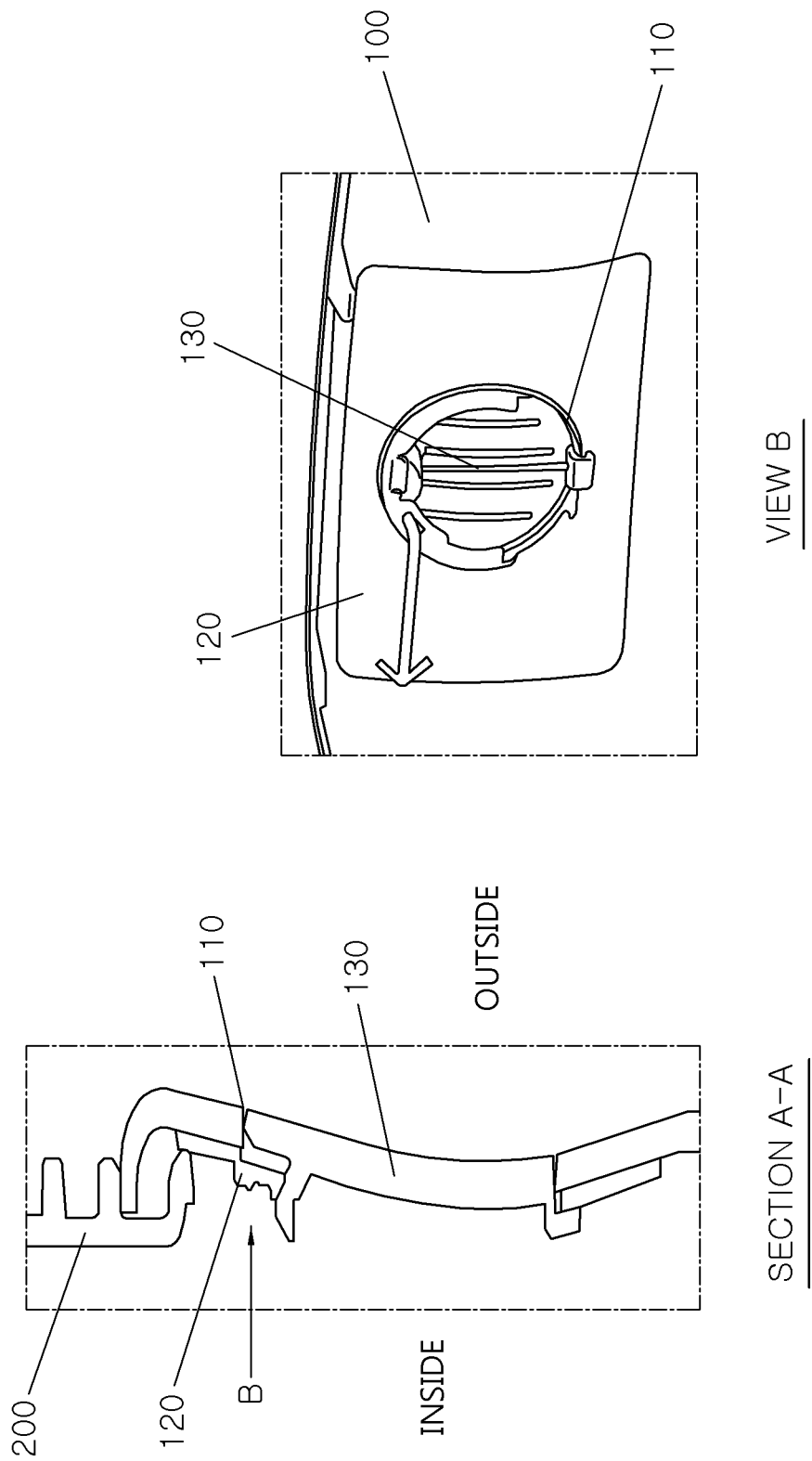
FIG. 12 is a cross-sectional view of a bumper skid plate according to an exemplary embodiment of the present invention.

On the other hand, FIGS. 11 and 12 illustrate an example of a bumper to which a bumper skid plate 100-1 is applied.

As illustrated, the bumper skid plate 100-1 is manufactured using the 2-process product assembly device 1 of FIG. 1, FIG. 2, FIG. 3, and FIG. 4 or using the method for manufacturing the bumper skid plate of FIGS. 5 to 10. Accordingly, the bumper skid plate 100-1 includes the bumper skid plate injection material 100 that is injection-molded with a material of a metallic tone (or metallic-tone material), the bracket 120 for assembling the towing hook cap that is fused onto the towing hook hole 110, and the towing hook cap 130 that is fitted into the towing hook hole 110 through the post-process.

Figure 13:
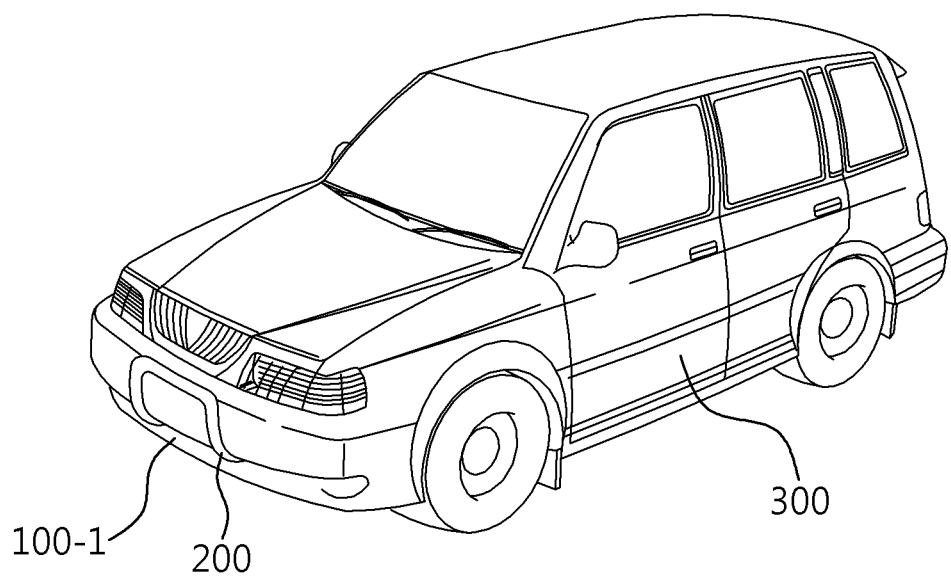
FIG. 13 is a view illustrating an example in which a bumper skid plate according to an exemplary embodiment of the present invention is applied to the vehicle bumper.

On the other hand, FIG. 13 illustrates an example of a vehicle 300 to which a bumper 200 that is constructed together with a bumper skid plate 100-1 is applied.

As illustrated, the bumper 200 is mounted on the front portion (and the rear portion) of the vehicle 300, and a bumper skid plate 100-1 is attached to the lower portion of the bumper 200. Accordingly, the bumper and the lower portion of the vehicle can be protected against the road impact, and a tough external appearance design is reinforced to secure stability through sensing of the front and rear side of the vehicle using sensors. In particular, since the bumper skid plate 100-1 is manufactured through the bumper skid plate injection material that is injection-molded with the material of the metallic tone (or metallic-tone material), the coating peel-off problem that causes the occurrence of the field claim can be completely solved.

As described above, the two different process continued performance type product assembly device according to the present exemplary embodiment includes the punching die 10 having the punch 17, the punching tool 30 having the punching die 31 for the punching work, the fusion tool 40 having the fusion horn 41 for the fusion work, and the tool exchange cylinder 300 that pushes or pulls the punching tool 30 to make the working lines K-K of the punch 17 and the punching tool 30 coincide with each other or to make the working lines K-K of the punch 17 and the fusion horn 41 coincide with each other. Accordingly, the punching work of the towing hook hole 110 with respect to the bumper skid plate injection material 100 of the metallic tone and the fusion work of the bracket 120 for assembling the towing hook cap can be performed at one place without movement, and as a result, the bumper skid plate 100-1 can be manufactured through a reduced space and manpower to greatly improve the product quality and productivity. In particular, the coating process is not required in the post-process through the use of the material of the metallic tone, and thus the field claim problem occurring due to the peel-off of the coatings can be solved.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A product assembly device for a two different process continued performance, the product assembly device comprising:
  a punching jig having a punch and configured to ascend and descend;
  a punching tool located on a lower portion of the punching jig and having a punching die located below the punch during a punching work;
  a fusion tool located on the lower portion of the punching jig and having a fusion horn located below the punch during a fusion work; and
  a tool exchange cylinder configured to push the punching die so that the fusion horn secedes from a position below the punch during the punching work and to pull the punching die so that the fusion horn comes into the position below the punch during the fusion work, wherein the punching jig, the punching tool, and the fusion tool are coupled to a guide frame, and wherein the guide frame includes a jig bracket on which the punching jig is mounted, a cylinder bracket on which the punching tool and the fusion tool are mounted, a mount plate having an upper portion that is formed by the punching jig bracket and a lower portion that is formed by the cylinder bracket, and an LM guide configured to couple the punching jig bracket and the mount plate to each other.

2. The product assembly device according to claim 1, wherein the punching jig further includes a motor and a ball screw that are engaged together by a timing belt, and wherein the ball screw is fixed to the punching jig bracket on which the punch is mounted to make the punching jig bracket ascend and descend in a rotating direction of the motor.

3. The product assembly device according to claim 2, wherein the punching jig further includes a stripper coupled to the punch, and an original point sensor coupled to the punching jig bracket to detect ascending and descending positions of the punching jig bracket.

4. The product assembly device according to claim 1, wherein a product setting jig is located on an upper side of the punching tool and the fusion tool, and a product is put on the product setting jig for the punching work and the fusion work.

5. The product assembly device according to claim 4, wherein the product setting jig is constructed together with a product fixing jig, and the product fixing jig fixes the product.

6. The product assembly device according to claim 1, wherein the punching work and the fusion work are performed in an ultrasonic manner.

7. The product assembly device according to claim 1, wherein the punching tool is arranged at an interval from a rear side of the fusion tool.

8. The product assembly device according to claim 1, wherein the LM guide includes an LM rail provided on the mount plate and an LM block provided on the punching jig bracket.

9. The product assembly device according to claim 1, wherein the punching tool further includes a link bracket configured to connect the punching die and the tool exchange cylinder to each other, and the link bracket is hinge-engaged with the cylinder bracket.

10. The product assembly device according to claim 1, wherein the fusion tool further includes a fusion cylinder configured to make the fusion horn ascend and descend, and the fusion cylinder is coupled to the cylinder bracket.

11. The product assembly device according to claim 1, wherein the punching work and the fusion work are automatically controlled by a control device.

* * * * *